(No Model.) 4 Sheets—Sheet 2.
H. B. WHITTAKER & G. F. GODLEY.
SPRING MOTOR.
No. 292,970. Patented Feb. 5, 1884.
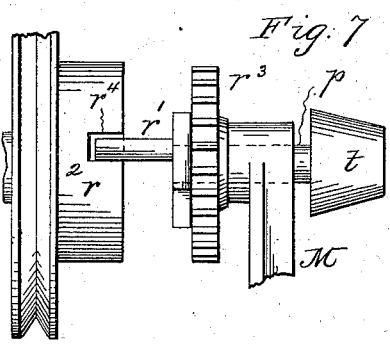
Fig. 7
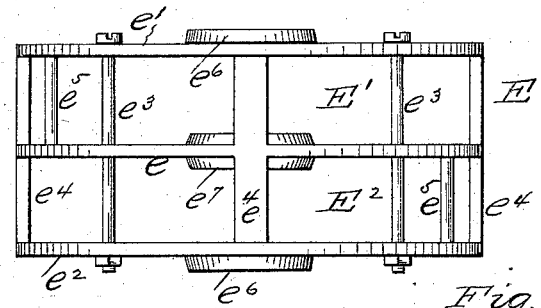
Fig. 8
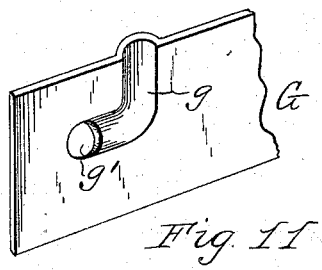
Fig. 11
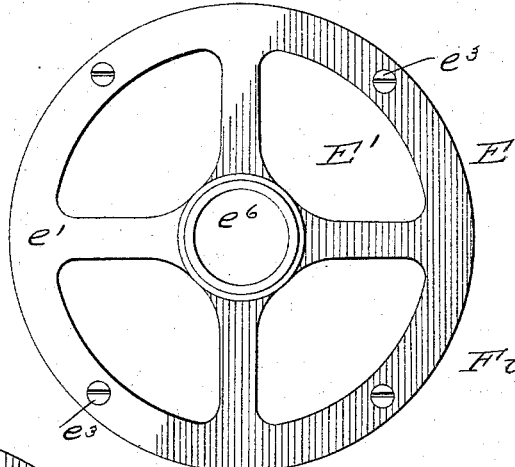
Fig. 9
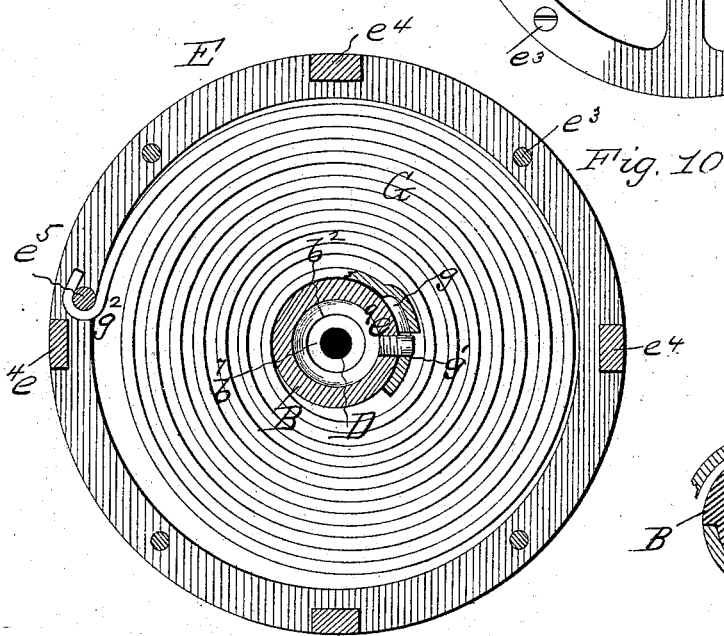
Fig. 10
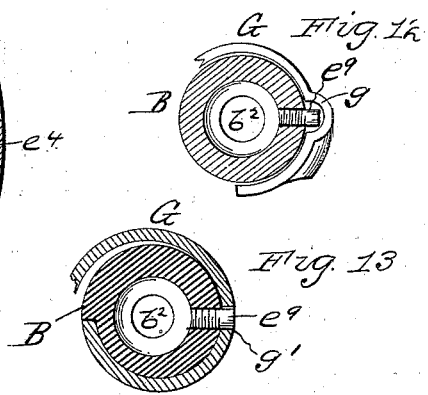
Fig. 12
Fig. 13
WITNESSES:
R. N. Van Stavoren
C. W. Williams
INVENTORS
Henry B. Whittaker
George F. Godley
By S. J. Van Stavoren
ATTORNEY.

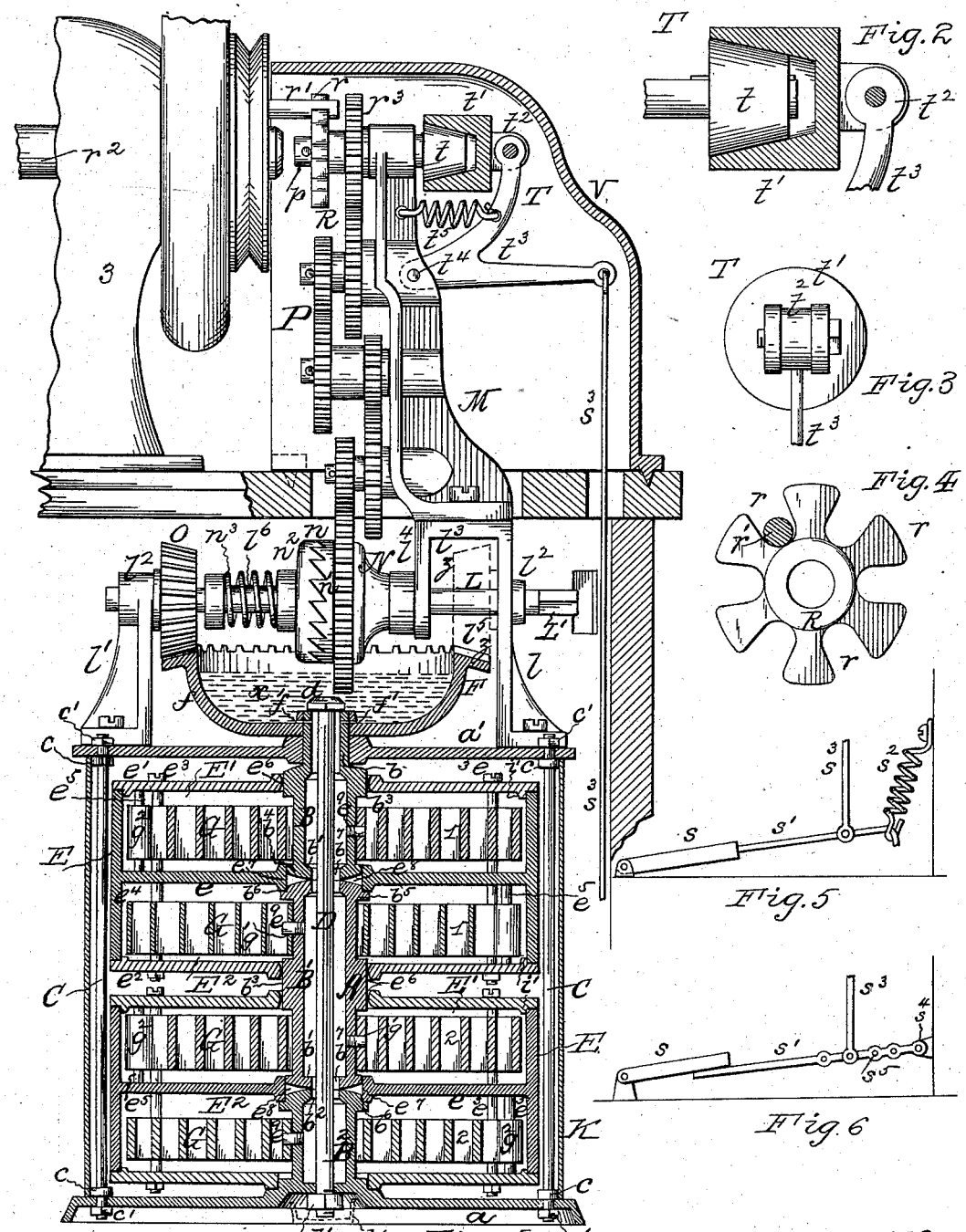

(No Model.) 4 Sheets—Sheet 3.

H. B. WHITTAKER & G. F. GODLEY.
SPRING MOTOR.

No. 292,970. Patented Feb. 5, 1884.

WITNESSES:
R. H. Van Stavoren,
C. W. Williams

INVENTORS.
Henry B. Whittaker
George F. Godley
By S. J. Van Stavoren
ATTORNEY (No Model.) 4 Sheets—Sheet 4.

H. B. WHITTAKER & G. F. GODLEY.
SPRING MOTOR.

No. 292,970. Patented Feb. 5, 1884.

WITNESSES:

INVENTORS,
Henry B. Whittaker
George F. Godley
By S. J. Van Stavoren
ATTORNEY.

UNITED STATES PATENT OFFICE.

HENRY B. WHITTAKER AND GEORGE F. GODLEY, OF PHILADELPHIA, PA.

SPRING-MOTOR.

SPECIFICATION forming part of Letters Patent No. 292,970, dated February 5, 1884.

Application filed November 28, 1883. (No model.)

*To all whom it may concern:*

Be it known that we, HENRY B. WHITTAKER and GEORGE F. GODLEY, citizens of the United States, residing at Philadelphia, in the county of Philadelphia and State of Pennsylvania, have invented certain new and useful Improvements in Spring-Motors, of which the following is a specification, reference being had therein to the accompanying drawings, wherein—

Figure 14:
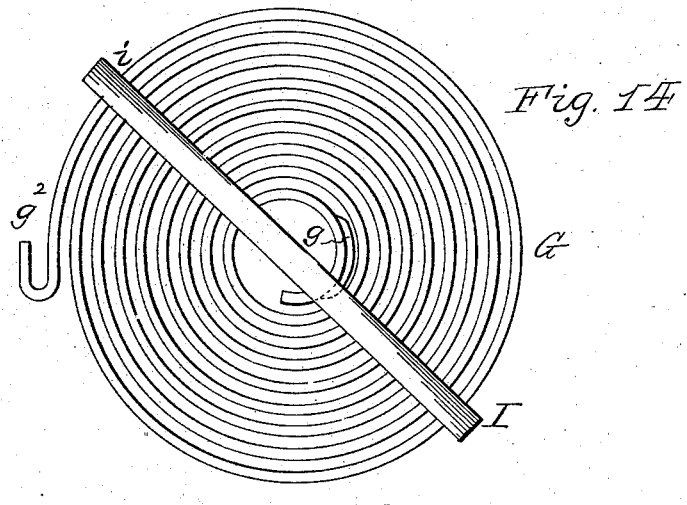
Figure 15:
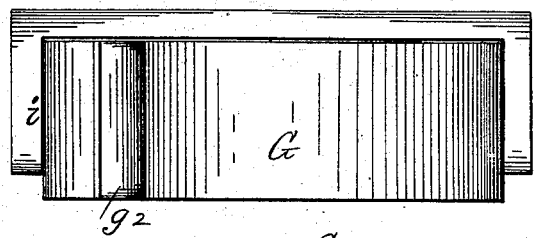
Figure 16:
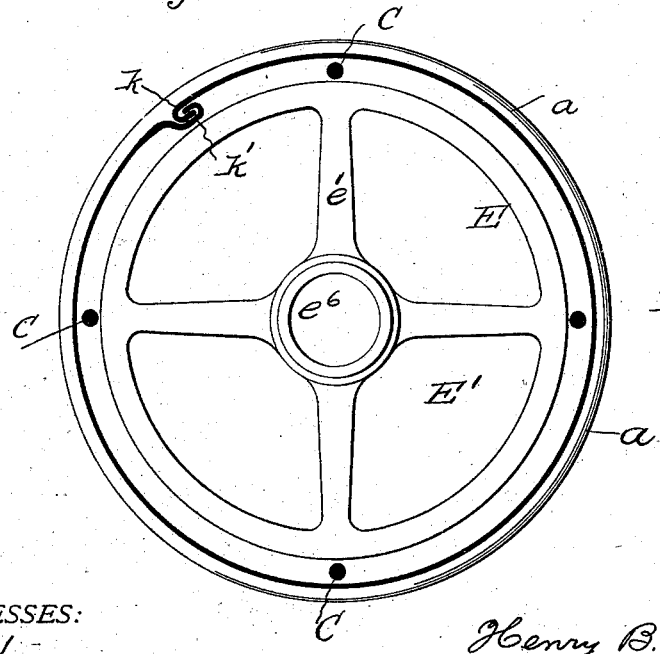
Figures 17, 18:
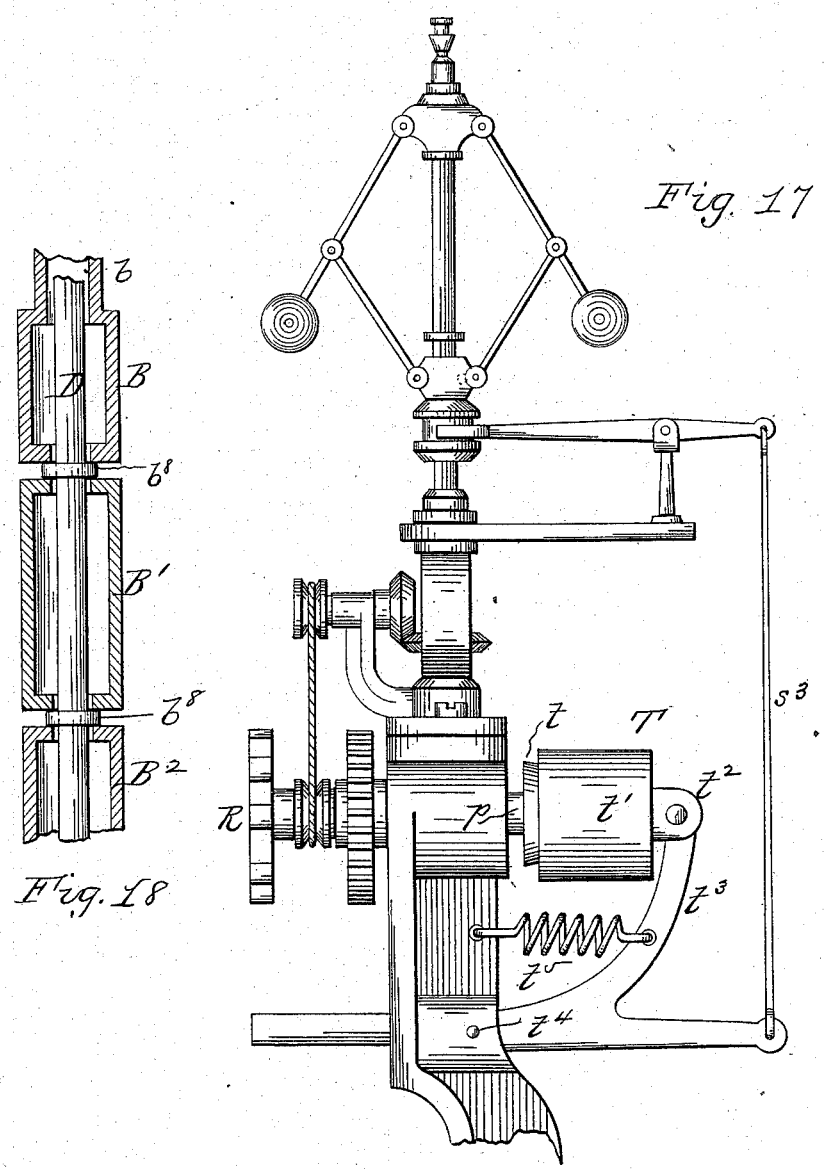

Figure 1 is a longitudinal vertical section of a motor embodying our invention. Fig. 2 is an enlarged sectional view of brake mechanism therefor. Fig. 3 is a rear view of same. Fig. 4 is a detail view of star-wheel and eccentric driving-pin, the latter being in section. Figs. 5 and 6 are broken detail elevations of two different forms of treadle mechanism for controlling the brake. Fig. 7 is a broken elevation of a modification of star-wheel and eccentric driving-pin mechanism. Fig. 8 is an elevation of the cage or barrel for the springs. Fig. 9 is a plan of same. Fig. 10 is a horizontal section of the cage and mandrel, showing the spring and its connections therewith. Fig. 11 is a broken perspective of one end of a spring. Fig. 12 is a detail sectional plan of mandrel and end of spring. Fig. 13 is a detail section of cam or eccentric form of mandrel in cross-section. Fig. 14 is a plan of spring and clamp or bar for holding the coiled or wound spring together to maintain it in such condition until its ends are secured to its respective cage and mandrel. Fig. 15 is an elevation of same. Fig. 16 is a sectional plan of casing for the motor. Fig. 17 is an elevation of governor attachment, and Fig. 18 is a section of modified form of sectional spring-shaft.

Our invention has relation to improvements upon the spring-motor for which Letters Patent of the United States were granted to us May 29, 1883, and has for its objects to provide for attaching the motor directly to the operating-shaft of the machine or apparatus designed to be driven or supplied with power; second, an improved brake attachment whereby the movement or power of the motor is easily and quickly controlled and its speed varied as desired; third, to prevent waste of power by reducing the friction or extent of surface contact between the moving parts of the motor; fourth, an easily and readily detachable or disengaging eccentric mechanism for effecting an engagement between the motor and the device to be driven thereby; fifth, an improved mode of supporting the mandrels or spring-shaft sections, and the manner of oiling their bearings or contact surfaces; sixth, an improved construction of cages or spring-barrels; seventh, connections for the springs, mandrels, and cages; eighth, equalizing the draft of the springs by making them of different capacities; ninth, to prevent undue lateral strain during the uncoiling or unwinding of the springs by connecting the ends of each spring to opposite sides of its respective mandrel and cage; tenth, an improved method of inserting the springs into and securing them to the cages and mandrels; and, finally, the detail improvements hereinafter described and claimed.

In the drawings, A represents the spring-shaft of the motor, composed of hollow sections or mandrels B, B', and B², the latter being part of or firmly secured to the base-plate $a$. The upper or first mandrel, B, has an elongated reduced part or shoulder, $b$, which has a bearing in the top plate, $a'$. The plates $a\ a'$ form part of the casing of the motor, and are connected together or maintained at a suitable distance apart by pillars or posts C, having collars $c\ c$ and jam-nuts $c'\ c'$. The adjacent ends of the mandrels are made rounding or flare apart to reduce the extent of surface contact, and have inner flanges, $b'$, with central openings, $b^2$, and exterior collars or flanges, $b^3$, $b^4$, and $b^5$, the last of which is provided with a shoulder, $b^6$. Through the center of the mandrels passes a loose rod or bolt, D. Its head $d$ rests upon the upper edge of shoulder $b$, or is otherwise disposed to close the upper tubular opening through the mandrels. The lower end of rod D passes through the base-plate $a$ and is provided with a retaining-nut, $d'$. The rod D holds the mandrels in due alignment, while their rounded edges or ends not only reduce their surface contact, but also permit them to slightly bend out of a vertical line or yield longitudinally without producing undue binding or friction, sufficient play-space, $b^7$, being provided in their ends to admit of such movement. The last-described result may also be produced with square-end mandrels by interposing the loose washers or disks $b^8$, as indicated in Fig. 18.

E E represent the cages or barrels of a skeleton or other desired form, divided into two compartments, E' and E². Each cage is composed of a central plate, $e$, and loose or removable top and bottom plates, $e'$ and $e^2$, all of which are connected together by bolts or screws $e^3$. To the central plate, $e$, are secured or cast therewith posts or pillars $e^4$, and are provided with round rods $e^5$, or other suitable means for attachment of the outer ends of the springs. Each apartment of the cages is therefore provided with a round bar or spring connection, $e^5$; but such bars are arranged on opposite sides of the cages, as shown. The central openings, $e^6$, in the top and bottom plates of each cage have rounded or feather edges, and are of a larger diameter than that of the opening $e^7$ in the center plate, $e$, to permit the collars $b^3$ $b^4$ of the mandrels passing therethrough. The collars $b^3$ $b^3$ form bearing-surfaces for the upper and lower cage-plates, $e$ $e$, while the collar $b^5$ engages with the central plate and forms a supporting-bearing for holding the cage in position around or upon the mandrels, so that the former may revolve with or independently of the latter. The shouldered collars $b^5$ therefore form the main or supporting bearings for the cages, and as these bearings are on a line with, or are so arranged that they cause the walls of the central openings in the center plates, $e$, of the cages to surround the flaring ends of the mandrels, spaces or recesses $e^8$ $e^8$ are provided between the mandrel ends and the main bearing of the cages for the reception of a lubricant for all of the bearings located adjacent thereto or surrounded thereby.

To the shoulder $b$ of mandrel B is secured a dish-shaped miter or driving wheel, F, the body $f$ of which serves as a receptacle for holding oil, as indicated at $x$, for lubricating the mandrel and cage bearings. The oil is designed to be conducted into the tubular part of the mandrels, either by the channels or openings $f'$, formed in the hub of the wheel F and shoulder $b$, or by finding a passage between the bolt-head $d$ and the upper edge of shoulder $b$. If desired, however, such oil may be otherwise suitably conveyed to the central opening of the mandrels. In any case the oil, when conducted thereto, trickles down the mandrels on their inside walls or surfaces, and successively passes into the spaces $e^8$ $e^8$, and lubricates the mandrel and cage bearings. Any surplus oil is collected in mandrel B², from which it may be drawn off from time to time by loosening the nut $d$; or an opening may be formed in the base-plate adjacent to said nut for conveying the surplus oil to a pan placed beneath said plate, as indicated by dotted lines $y$.

If desired, a channel or opening may be formed in the bottom of wheel F, for conveying oil to the bearing of shoulder $b$ and plate $a'$, and to the outside mandrel-collars, $b^3$ $b^3$; but this is not essential, as such bearings are more in the nature of steadying than supporting bearings, and do not require lubrication. The mandrels are also provided with lateral projecting studs or pins $e^9$, affixed thereto in any suitable manner, and to which are secured the inner ends of the springs. These studs are so located that they are alternately on opposite sides of the mandrels or spring-shaft, or none of them are opposed to the round bars $e^5$ or outer end connections of the springs; or, in other words, both end connections of the springs are not located on one or the same side of the cage-apartments, as is the case in our aforesaid patent, but are so arranged or disposed that the springs have reverse end connections with the mandrels and cages.

G G represent the springs—two in each cage—one being of a different capacity than that of the other, so as to provide for an equalization in the draft of the springs. While we deem such construction of springs a preferable one, yet we do not limit ourselves thereto, as the springs may, if desired, be made of the same capacity, or otherwise arranged or constructed. To provide springs of varying power or strength, they may be of different thicknesses, as shown at 1 1, Fig. 1, or of the same thickness, but of unequal width, as illustrated at 2 2, same figure; or such result may be accomplished by any other desired mode of construction or arrangement. The inner end of each spring, or that which is attached to the mandrel, is provided with an L-shaped depression or upsetting, $g$, (see Fig. 11,) terminating in an opening, $g'$, through which the mandrel-pin $e^9$ passes, and thereby secures the spring end thereto. The other or outer end of the spring is bent or formed into a hook, $g^2$, which engages with the round bar $e^5$ on the cage-apartment. By such construction the ends of the springs are provided with loose connections, both with the mandrels and cages, and the described connections are made at the time the springs are placed in the cages. The round bar or spring connection $e^5$ in each cage-apartment being located on opposite sides of the cage, and the mandrel-studs being similarly located on the sides of the mandrel opposite to that on which said round bars are located in the cage, provides a reverse end connection for each spring, which completely equalizes or neutralizes the torsional strains of the unwinding of the spring, and thereby effects a saving of spring-power. The springs are inserted in the cages in a coiled or wound condition, and the insertion is made before the top and bottom cage-plates are in position. When the springs are coiled or wound, a clamp or bar, I, with bent ends, of a size or extent equal to the inner diameter of the cage, is placed over the spring, which is then allowed to partially unwind until it frictionally engages with the ends of said bar, as shown at $i$ in Figs. 14 and 15. The spring is thereby held or locked in a partially or an initial unwound condition, and is then inserted in one of the cage-apartments in such manner that its outer end, $g^2$, engages with the bar $e^3$, and its inner end depression, $g$, slides by the mandrel-stud until it enters the opening $g^2$. When the described end connections have been made, a slight winding movement, either of the cage or mandrel, releases the clamp I. When the cage is filled with springs, its removable plates are secured thereto. Said plates, if desired, may be provided with lugs $i'$ for abutments against the pillars or posts $e^4$.

In the drawings we have shown three mandrels and two cages; but it is obvious that any desired number of said parts may be employed, it being a matter of duplication only, to increase the size or strength of the motor.

K represents a removable casing for the motor, composed of flexible metal or other material, having hooked edges $k\ k'$, which engage with each other and secure or lock the casing in position. From the top plate, $a'$, project standards $l\ l'$, having bearings $l^2$ for a shaft, L. The standard $l$ is formed with a seat, $l^3$, for a bracket, M, and a depending lug, $l^4$, against which abuts a gear-wheel, N, loosely secured to shaft L. Between the lug $l^4$ and standard $l$ is a space, $l^5$, for a purpose hereinafter stated. The loose wheel N is provided with a clutch, $n$, of any suitable construction. In the drawings, one part, $n'$, of the clutch is represented secured to or formed on wheel N, and the other part, $n^2$, is mounted on shaft L, so as to slide thereon, and is rotated therewith by means of a feather, spline, or equivalent device, $l^6$. $n^3$ is a spring for normally holding the parts of the clutch in engagement.

O is a bevel or other wheel secured to shaft L, and meshes with wheel F, so that when the springs unwind and rotate the mandrels or spring shaft and wheel F power is transmitted to shaft L to rotate clutch $n$ and loose wheel N, to transmit motion or power to a train of gearing, P, mounted on shafts secured in bracket M.

Upon the upper shaft, $p$, is attached a star-wheel, R, the recesses $r$ of which receive an eccentric pin or stud, $r'$, secured in the end of a driving-shaft, $r^2$, or a collar thereon, of the machine designed to be supplied with motive power. In the drawings said shaft is represented to be the needle-bar driving-shaft of a sewing-machine, part of which is indicated at 3, Fig. 1. The full power of the motor is therefore directly applied to the operating parts of the machine driven, and none of it is uselessly expended or wasted in moving the mechanism heretofore interposed between the motor and the operating parts of the driven machine. The employment of the star-wheel R permits the stud $r'$ to rise out of the recesses $r$ when the sewing-machine is tilted for obtaining access to the shuttle or bobbin, said pin returning to its normal position when the machine is lowered, thereby providing an easily-connected and readily-detachable engaging device between the motor and said machine. In Fig. 7 we have shown a modification of such connection, wherein the pin or stud $r'$ is secured to the wheel $r^3$ on shaft $p$, and the end of the sewing-machine shaft $r^2$, or a collar thereon, is formed with a transverse slot, $r^4$, into which the pin passes and engages therewith.

T represents the braking attachment, consisting of a truncated cone, $t$, secured to shaft $p$ by a key or other fastening device, as shown in Fig. 2; or it may be formed integral with said shaft, as illustrated in Fig. 1, and has a socketed bearing-block, $t'$, for frictional engagement therewith. Said block is pivoted or fastened at $t^2$ to a lever, $t^3$, fulcrumed at $t^4$ on the bracket M. The lever $t^3$ is provided with a spring, $t^5$, which normally acts to move the block $t'$ into engagement with the cone $t$, to form a brake for preventing the unwinding of the springs. The means for controlling the brake or the transmission of the motive power depend upon the machine to be driven. When sewing or other like machines are to be operated, a treadle attachment is preferable; but when blowers for gas-machines or similar devices are to be driven, a governor may be connected to the brake-lever to automatically control the movement of the motor or the degree of expenditure of its power. A form of governor attachment is shown in Fig. 17, and it may be of any desirable or suitable construction.

Various forms of treadle mechanism may be employed, two of which are indicated in Figs. 5 and 6, that of the former consisting of a pivoted foot-piece, $s$, placed upon the floor or base of the frame supporting the motor, or otherwise, as desired or convenience may dictate, and it carries an arm, $s'$, provided with a retracting-spring, $s^2$. To the arm $s'$ is secured a rod, $s^3$, which connects with the brake-lever $t^3$. In Fig. 6 the bar or arm $s'$ is separate from but engages with foot-piece $s$, and is pivoted at $s^4$ to the motor-frame, and has a series of adjusting-holes, $s^5$, for the end of rod $s^3$, for varying the throw or movement of said rod $s^3$, to increase or decrease the extent of motion of lever $t^3$ and block $t'$, and modify the force or power of the brake.

V represents a removable casing or cover for the bracket M and its appurtenances when arranged as shown in Fig. 1.

The shaft L has an angular end, L', for the reception of a suitable winding-crank. The winding is effected by turning said shaft in a direction the reverse of that in which it is driven by the motor-springs. Such reverse rotation causes the parts of the clutch $n$ to slip by each other, the wheel N remaining stationary, while the bevel-wheel O turns wheel F and rotates the mandrels to wind the springs. The shaft L therefore serves the double purpose of a driving and winding shaft.

If desired, the mandrels may be made cam or eccentric shape in cross-section, as shown in Fig. 13, to receive or take up the inner end of the springs and prevent said end forming a shoulder for the succeeding coils of the spring to bend around when wound up, thereby avoiding wear of the coils at such point, liability of breakage of the spring, and reducing the friction between its coils.

We do not limit ourselves to the construction herein shown and described of the novel detail parts, as they may be greatly varied or reversed in position without departing from the spirit of our invention. Thus, for instance, the cone of the brake may be secured to the lever $t^3$, and the block $t'$ to shaft $p$. The bracket M may be arranged horizontally or at an angle with the top plate, $a'$, its position depending upon the location of the operating-shaft of the driven machine, and a friction instead of a spur clutch may be employed for shaft L or wheel N. Again, the shaft L may, if desired, be rotated by the springs in an opposite direction to that indicated in the drawings by transferring the pinion or wheel O to the opposite end of said shaft or within the space $l^5$ of standard $l$, as indicated by dotted lines $z$ $z$, thereby making the motor applicable to right or left operating machines. So, too, if desired, the inner ends of the springs may be made hook shape, and their outer ends have the depression $g$, with opening $g'$, in which case the studs $e^9$ will be transferred from the mandrels to the cages, and the round bars $e^5$, or equivalent devices, affixed to the mandrels.

What we claim is—

1. A spring-motor having an attachment, substantially as shown and described, for connecting it to the operating-shaft of the driven machine, as set forth.

2. The combination, with an operating-shaft of a driven machine, of a spring-motor and interposed detachable connecting mechanism, substantially as shown and described.

3. The combination, with a driven shaft having an end eccentric pin or stud, of a spring-motor shaft carrying a star or recessed wheel for engagement with said pin, substantially as shown and described.

4. A spring-motor provided with a detachable eccentric device for engagement with the operating or other shaft of the driven machine, substantially as shown and described.

5. A spring-motor shaft, $p$, provided with a brake composed of a cone and correspondingly-recessed bearing-block and mechanism for controlling its action, substantially as shown and described.

6. In a spring-motor, the shaft $p$, having a brake composed of a cone and a block fitting thereon, and secured to a pivoted lever having mechanism which acts to normally engage the parts of the brake, substantially as shown and described.

7. A spring-motor brake, T, composed of a friction-wheel, $t$, recessed block $t'$, lever $t^3$, spring $t^5$, and a treadle mechanism for controlling the action of the brake, substantially as shown and described.

8. A spring-motor having a brake attachment with operating-lever, and a treadle mechanism composed of a pivoted foot-piece, $s$, and bar $s'$, having adjusting apertures or points of connection $s^3$, as and for the purpose set forth.

9. In combination with a spring-motor having bracket attachment M, the removable casing V, substantially as shown and described.

10. In a spring-motor, the end or last shaft, $p$, carrying a brake attachment and an engaging device for the driven shaft of the device to be operated by the motor, substantially as shown and described.

11. A spring-motor having a shaft, $p$, with end brake, T, and recessed or star wheel R, substantially as shown and described.

12. A spring-motor having a driving-shaft, L, arranged to serve as a winding-shaft, substantially as shown and described.

13. In a spring-motor, the shaft L, carrying loose wheel N, clutch $n$, pinion $o$, and having a winding end, L', substantially as shown and described.

14. A spring-motor shaft, L, arranged substantially as shown and described, and provided with a transferable pinion, O, whereby said shaft may be rotated in reverse directions, and the motor adapted for right-and-left operating or driven machines, substantially as shown and described.

15. In combination with a spring-motor, the shaft L, supported in standards $l$ $l'$, the latter having a seat, $l^3$, of a bracket, M, carrying multiplying-wheels, a brake attachment, and connecting devices, substantially as shown and described.

16. In a spring-motor, the standard $l$, having seat $l^3$, lug $l^4$, and space $l^5$, substantially as shown, and for the purpose set forth.

17. In a spring-motor, the combination of a shaft or arbor having projecting studs, a cage having rods or posts, and springs having in one end a recess or depression terminating in an opening, and the other end being bent or made hook shape, whereby the springs may be loosely secured to the arbor and cage, substantially as shown and described.

18. A spring-motor composed of a sectional arbor, revolving cages, and interposed springs, each of which has its ends connected to its respective arbor-section and cage on opposite sides of the same, substantially as shown and described.

19. A spring for motors, having an opening in one end and an opposite bent or hooked end, substantially as and for the purpose set forth.

20. A spring for motors, having a depression terminating in an opening at one end and an opposite hooked or bent end, substantially as shown and described.

21. The spring G, having hooked end $g^2$ and depression $g$, with opening $g'$, as shown and described.

22. A spring-motor having a hollow sectional mandrel with a central stationary supporting-rod, substantially as shown and described.

23. In a spring-motor, an arbor composed of tubular sections having rounded ends, as and for the purpose set forth.

24. A spring-motor having an arbor composed of tubular sections having rounded ends, and a central supporting-rod, substantially as shown and described.

25. In a spring-motor, the arbor B, having shoulder $b$, and the arbors B' B², having bearings $b^6 b^6$ for cages E E, substantially as shown and described.

26. In a spring-motor, a spring-shaft composed of a series of hollow arbors having collars $b^3 b^4$ and bearings $b^6$, substantially as shown and described.

27. In a spring-motor, the hollow sections B, B', and B², having oil cups or spaces at their junctions and a surrounding bearing for cages E, substantially as shown and described.

28. In a spring-motor, the hollow sectional mandrel B', having inner flanged ends with central opening or play space, $b^7$, and exterior bearing-collars, $b^3$, $b^4$, and $b^5$, with shoulder $b^6$, substantially as shown and described.

29. In a spring-motor, a hollow sectional arbor, a central support therefor, and means for lubricating the bearings of the arbors or sections and the cages, substantially as shown and described.

30. In a spring-motor, the sectional shaft A, carrying a lubricant-reservoir, and means for conveying the lubricant to the inside of shaft A, substantially as shown and described.

31. The combination of spring-shaft A, carrying wheel F and lubricant $x$, the loose supporting-rod D, and retaining-nut $d'$, substantially as shown and described.

32. The cage E, having removable top and bottom plates or arms and screw-connections therefor, substantially as shown and described.

33. The cage E, having removable top and bottom plates, and central plate, $e$, having oppositely-located spring-connections $e^5$, substantially as set forth.

34. In a spring-motor, the mode of inserting the springs in the barrels or cages and securing the ends of the springs to the cages and arbors, which consists in first coiling or winding the spring, then temporarily locking it in its wound or nearly wound-up condition, then inserting it in the cage, then securing its ends to the arbor and cage, and then releasing or unlocking the spring, as set forth.

35. A spring-motor provided with springs of varying capacity, substantially as shown and described.

36. A spring-motor having sectional spring-shaft made cam or eccentric shape in cross-section, as and for the purpose set forth.

37. A flexible case or covering, K, for spring-motors, having interlocking or hooked ends $k$ $k'$, substantially as shown and described.

38. In a spring-motor, the combination of a hollow shaft or arbor, a barrel, and an intervening spring or springs having detachable end connection with said shaft and barrel, substantially as shown and described.

39. A spring-motor having a sectional spring-shaft carrying springs of different capacity, and cages for the springs, substantially as shown and described.

40. In a spring-motor, the combination of a sectional shaft, revolving cages, springs connected to said shaft and cages, a driving and winding shaft, and a train of multiplying-wheels terminating in a shaft carrying a brake and an engaging attachment, as set forth.

In testimony whereof we affix our signatures in presence of two witnesses.

HENRY B. WHITTAKER.
GEORGE F. GODLEY.

Witnesses:
WM. ARMITAGE,
GEORGE W. WEART.